UNITED STATES PATENT OFFICE.

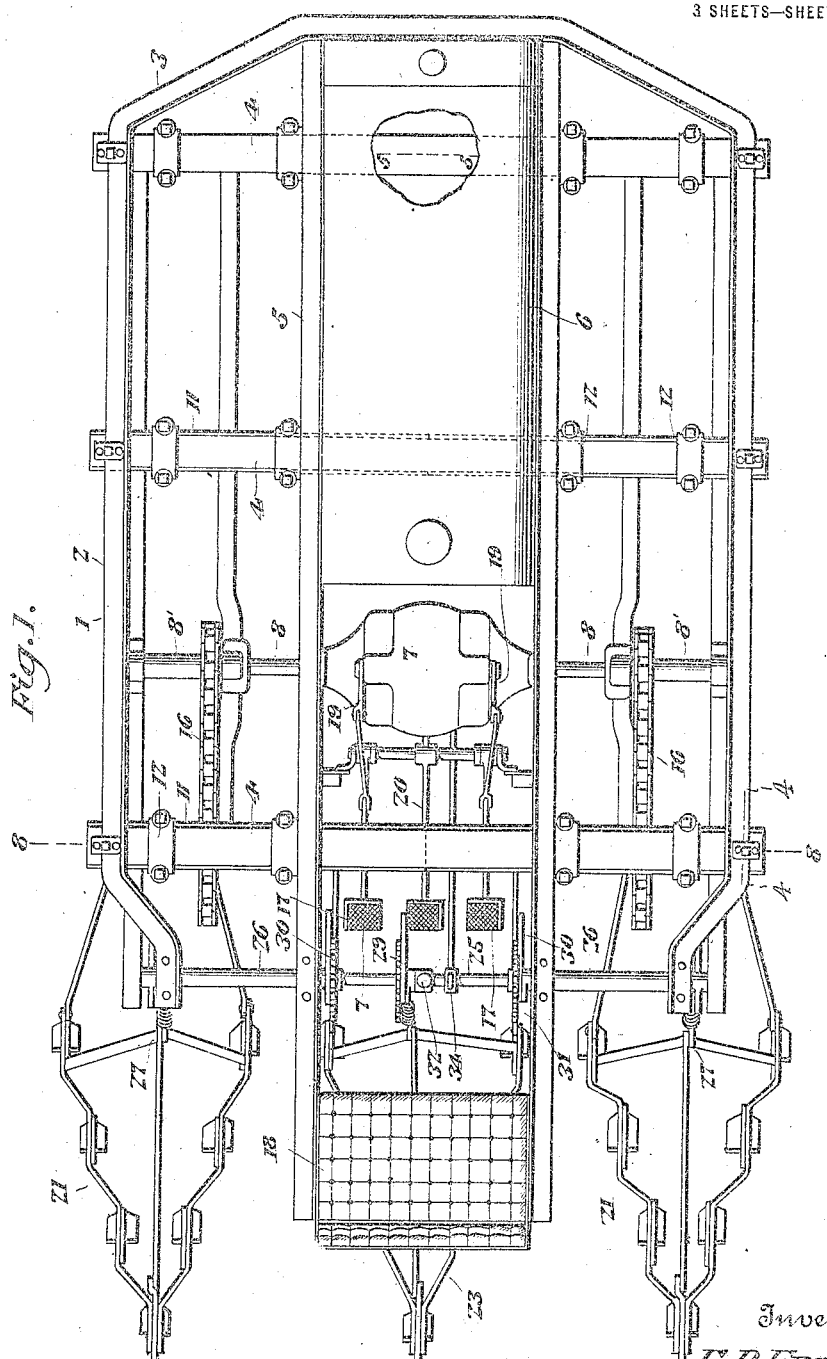

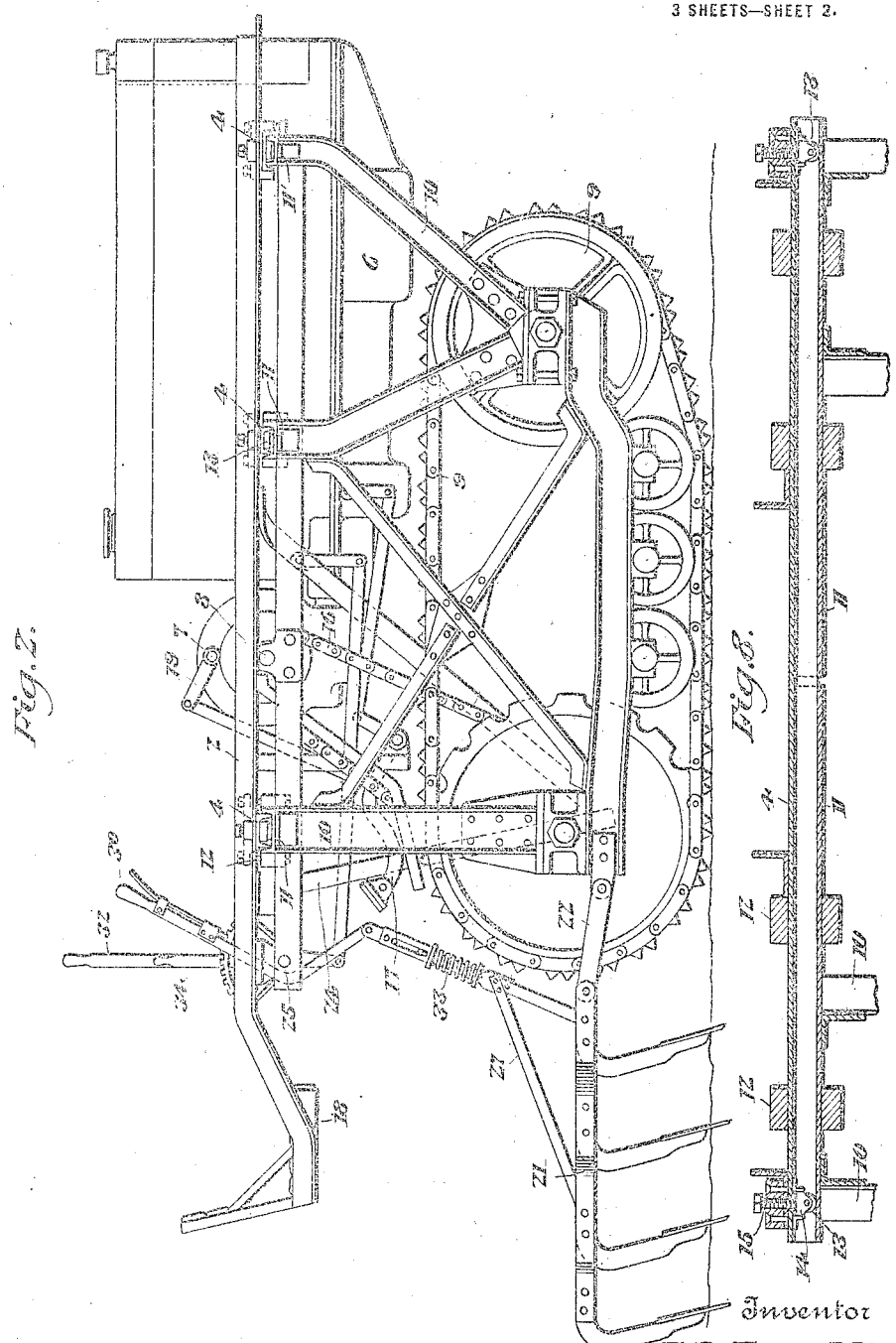

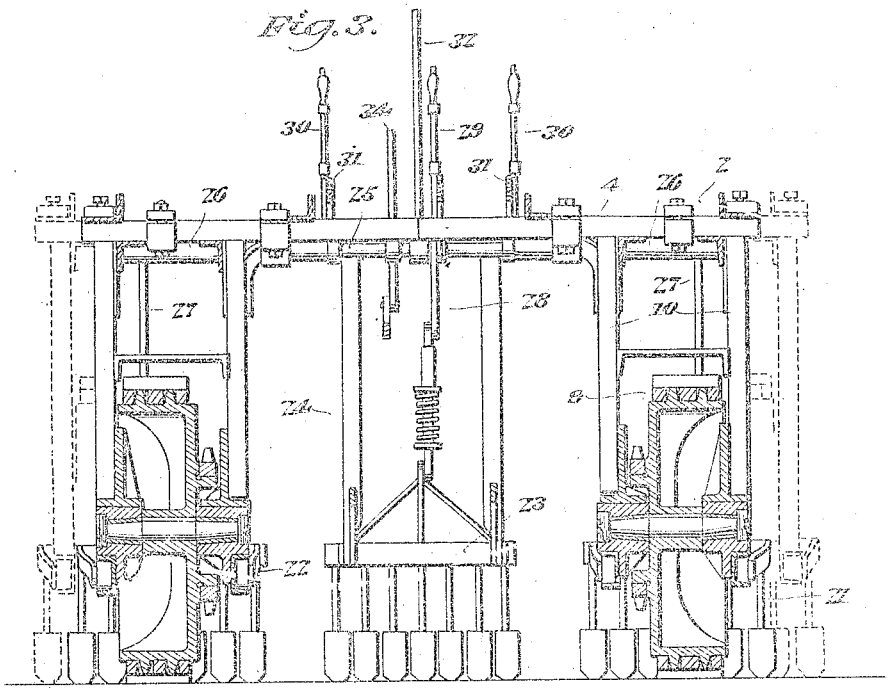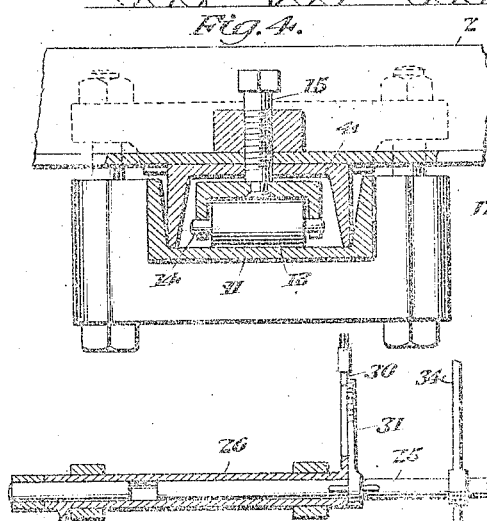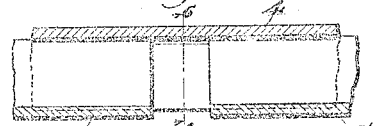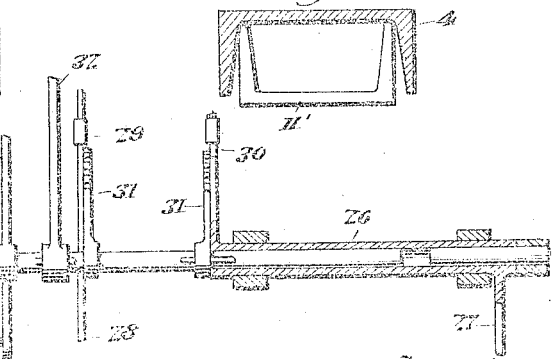

FLOYD P. FRANKLIN, OF SAN ANTONIO, TEXAS.

TRACTOR.

1,330,697.  Specification of Letters Patent.  Patented Feb. 10, 1920.

Application filed September 11, 1918. Serial No. 253,560.

*To all whom it may concern:*

Be it known that I, FLOYD P. FRANKLIN, a citizen of the United States, residing at San Antonio, in the county of Bexar and State of Texas, have invented new and useful Improvements in Tractors, of which the following is a specification.

This invention relates to new and useful improvements in tractors, and the principal object of the invention is to provide means for adjusting the tread thereof, or the distance from the traction elements on one side to those on the other.

Another object of the invention is to provide means whereby the tractor may be steered by the feet of the operator so as to leave the hands free to handle the operating levers for the implements.

Another object of the invention is to provide means for lowering and raising the different sets of implements independently of each other or all together.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which—
Figure 1 is a plan view of the invention,
Fig. 2 is a side view,
Fig. 3 is a rear view with parts in section,
Fig. 4 is a section on the line 4—4 of Fig. 1, Fig. 5 is a sectional detail showing how the inner ends of the sliding bars are arranged in the cross bar,
Fig. 6 is a section on line 6—6 of Fig. 5,
Fig. 7 is a view partly in section of the lifting means for the implements,
Fig. 8 is a section on the line 8—8 of Fig. 1.

In these views 1 indicates the main frame of the tractor which is made up of the side bars 2, the end bar 3, and the cross-bars 4. These latter bars are made from channel iron and they support the central engine supporting bars 5. 6 indicates the engine which may be of any suitable form. The engine is suitably connected with the differential gearing 7 to which the two part drive shaft 8 is connected. The tractor is supported by the well-known caterpillar driving means, indicated generally by the numeral 9. These means are carried by a supporting frame including the uprights 10. These uprights have their upper ends secured to channel bars 11, and said channel bars extend transversely and engage with the channel bars 4 of the main frame. As shown in the drawings the channel bars 11 at the front of the machine fit within the channel bar 4, see Figs. 5 and 6, while the other channel bars 11, receive the channel bars 4. As will be seen from the drawings the channel bars 11 and 11' are formed in pairs with each pair in one of the channel bars 4. In this way the lower channel bars may be moved outwardly to separate the frames carrying the caterpillar driving means. The upper and lower channel bars are held together by the clamps 12 so that said bars may be clamped together and thus held against movement. I locate rollers 13 at suitable points between said bars. The drawings show said rollers located at the outer ends of the bars. These rollers are mounted in a frame 14 which is swiveled on the end of a bolt 15 carried by the main frame. In this way when the clamps are loosened the bolts 15 may be turned to force the rollers against the lower channel bars to force said bars apart and thus facilitate the sliding movement of the lower bars on the upper bars. After the caterpillar means are adjusted to the proper width the clamps are again tightened to hold the parts in adjusted position.

The drive shaft is connected with the drive shaft of the caterpillar means by means of the chains 16. It will be understood that the caterpillar means on each side of the tractor are driven from one part of the two-part drive shaft and as this shaft is connected with the engine by the differential gearing said caterpillar means are independent of each other. I steer the tractor by means of the foot pedals 17, placed adjacent the seat 18, said pedals being connected with the two parts of the shaft by suitable braking means shown generally at 19. In this way by applying the brakes to one part of the shaft, the driving wheels on one side will have their speed checked while the wheels on the other side will continue at the same speed, so that the tractor will be caused to turn toward the side where the speed of the wheels is checked. 20 indicates the clutch pedal connected with the usual clutch devices. As will be seen the drive shaft is provided with sleeves 8', slidably mounted thereon so that the driving chains may move with the frames carrying the caterpillar means when said frames are adjusted.

The tractor is shown as pulling three gangs of cultivator plows. Each side gang, indicated by the reference numeral 21, is connected with the caterpillar frame by a link 22 while the central gang 23 is connected by a similar link to a depending frame 24 suitably connected with the main frame.

The means for raising and lowering the gangs consists of a bar 25 rotatably supported in the end of the main frame and having sleeves 26 slidably connected with its ends. The sleeves are held in adjusted position on said bar by any suitable means. Each sleeve is connected with one of the side gangs by means of the links 27, and the central gang is connected by links 28 with the lever 29 rotatably mounted on the shaft 25. Each sleeve is adapted to be rotated by means of a hand lever 30 connected therewith and the levers 29 and 30 are provided with the usual pawls which engage the teeth on the segments 31 rigidly secured to the shaft 25. In this way each gang may be actuated independently of the other gang. I also provide means for actuating all the gangs at once and such means consist of a master lever 32 secured to the shaft so that when said master lever is operated the shaft will be turned, which action will rock the segments 31 and through means of the levers 29 and 30 will move the three gangs at once. The connecting links for the gangs may be supplied with the usual shock absorbing springs 33.

34 indicates the lever for controlling the gear shift.

It will thus be seen that the tread of the tractor may be adjusted to different widths to suit rows of plants placed different distances apart, and as the various shafts are provided with sleeves these parts will be adjusted also. It will also be seen that any desired gang of cultivator teeth may be swung upwardly out of operative position and lowered without disturbing the other gangs and that all the gangs may be moved at the same time.

It is thought from the foregoing description that the advantages and novel features of my invention will be readily apparent.

I desire it to be understood that I may make such changes in the construction and in the combination and arrangement of the several parts, provided that such changes fall within the scope of the appended claims.

Having described my invention, what I claim and desire to secure by Letters-Patent is:

1. A tractor comprising a main frame including laterally extending bars, a supporting frame at each side of the main frame, laterally extending bars connected with said supporting frames and slidingly engaging the lateral bars of the main frame, means for securing said bars together in adjusted position and traction means carried by said supporting frames.

2. A tractor comprising a main frame, including laterally extending channel bars, a pair of lower channel bars slidably engaging each of the first mentioned bars, supporting frames connected with the lower bars, traction means carried by said supporting frames and means for clamping the upper and lower bars together in adjusted position.

3. A tractor comprising a main frame, including laterally extending channel bars, a pair of lower channel bars slidingly engaging each of the first mentioned bars, supporting frames connected with the lower bars, traction means carried by the supporting frames, means for clamping the upper and lower bars together in adjusted position and means for forcing said bars apart when unclamped, said means comprising a roller carrying frame located between the bars and a screw bolt for moving the frame vertically.

4. A tractor comprising a main frame, a frame on each side of the main frame, supporting wheels on said side frames, means for adjusting the side frames laterally in relation to the main frame, a drive shaft, sleeves thereon forming extensions of the shaft, means for connecting each sleeve to the supporting wheels on one of the side frames and means for driving the shaft.

In testimony whereof I affix my signature.

FLOYD P. FRANKLIN.